Oct. 24, 1939.  L. P. SMITH  2,176,935
MULTITORSION METER
Filed March 4, 1937
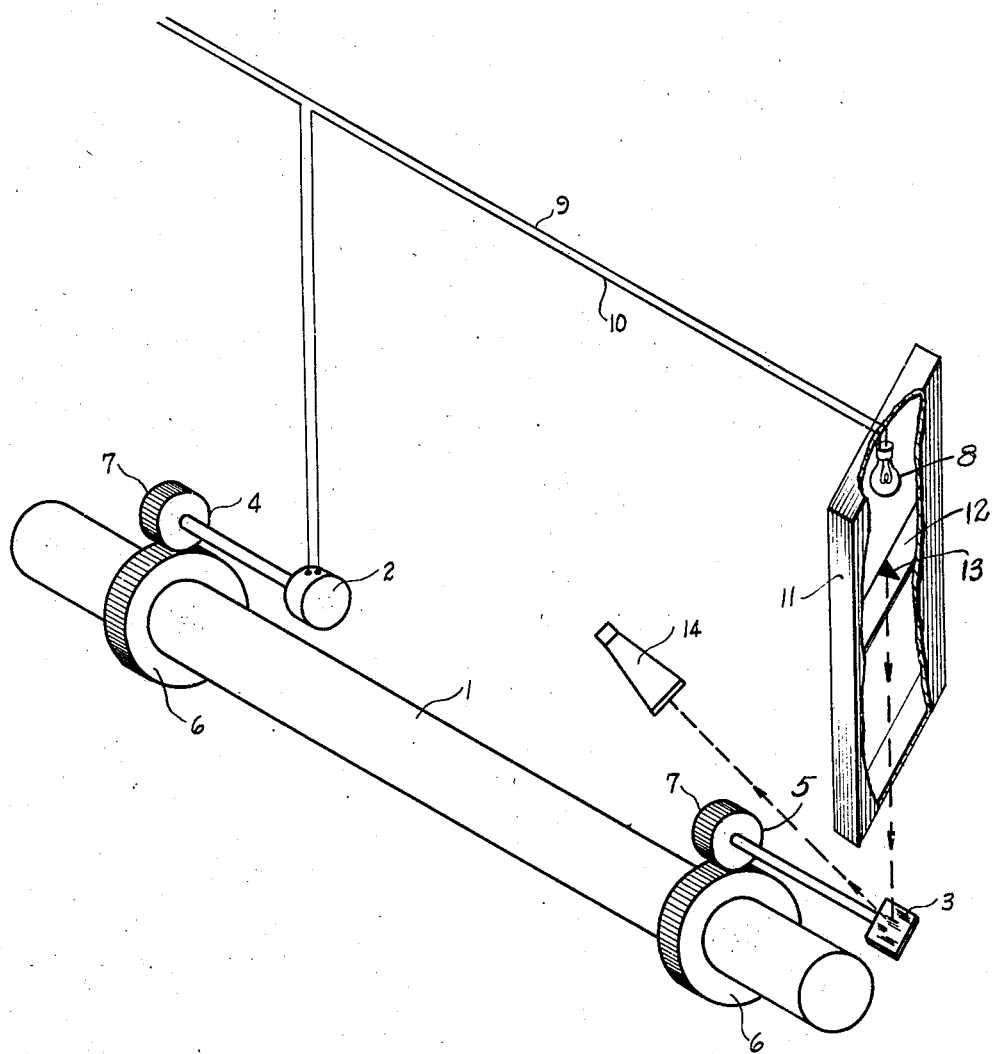
INVENTOR
LYBRAND P. SMITH
BY
*Robert A. Lavender*
ATTORNEY Patented Oct. 24, 1939

2,176,935

UNITED STATES PATENT OFFICE 2,176,935

MULTITORSION METER

Lybrand P. Smith, United States Navy

Application March 4, 1937, Serial No. 128,991

6 Claims. (Cl. 265—25)

(Granted under the act of March 3, 1883, as amended April 30, 1928; 370 O. G. 757)

This invention relates to an apparatus for observing the torsion phenomena in a power shaft rotating under load and more particularly to an apparatus which is an improvement over that disclosed in U. S. Patent 2,007,220 granted to me July 9, 1935.

In the aforesaid patent an apparatus was disclosed wherein flashes of light definitely timed with respect to definite phases of the angular position of one end of a shaft whose torsion was to be measured were reflected from a mirror which revolved with a definite relation to the angular position of the other end of the shaft. As long as the shaft was free from torsional forces each flash of light incident upon the rotating mirror was reflected at the zero mark on a suitable scale. But when the shaft twisted under torsion the mirror reflected the flashes to different portions on the scale the displacements of which from the zero mark gave a measure of the twist in the shaft. The flashes of light were caused by a rotatable shutter interrupting a source of constant light. Since in the construction of my apparatus it was necessary to position the rotatable shutter and mirror as close as possible to each other in order to insure proper definition of the reflected light flashes and the production of a reasonably compact unit, it became necessary to employ a more or less complicated set of mechanical, electrical or electro-mechanical driving connections intermediate the shaft on the one hand and the shutter and mirror on the other hand for imparting motion to the latter, thus adding considerably to the cost and complexity of the apparatus.

In carrying out my invention I have greatly simplified the apparatus of the aforesaid patent so as to make unnecessary the employment therein of the previously mentioned more or less complicated driving connections. I attain this end through the omission of the shutter heretofore employed and by the provision of a flashing or intermittently luminous light source. The flashing or occulting effect of the light source is produced by incorporating in the electrical circuit provided for its energization a rotatable switch or contactor for closing and interrupting the circuit at predetermined intervals, the switch or contactor for this purpose being driven through suitable instrumentalities by the shaft whose torsion is to be measured or observed.

With the foregoing in view it is the principal object of my invention to provide a greatly simplified apparatus for observing or measuring the torsion phenomena of a rotating shaft which is easy to construct and is susceptible of being economically manufactured.

Other objects and many of the attendant advantages of this invention will be readily appreciated as the same becomes better understood by reference to the following detailed description when considered in connection with the accompanying sheet of drawings wherein there is depicted one embodiment of the instant invention.

Referring now to the drawing 1 designates the shaft whose torsion is to be measured; and the reference characters 2 and 3 denote respectively the rotatable switch or contactor and rotatable mirror which are driven by the shaft at spaced points through suitable driving connections identified in general by the numerals 4 and 5. By reason of the employment of the aforesaid rotatable switch or contactor 2 it is possible to utilize greatly simplified sets of driving connections each of which, for illustrative purposes, is here shown as a gear 6 and a pinion 7. Some lost motion or slip will occur in any set of mechanical, electrical or electro-mechanical driving connections that it is mechanically practicable to make. However, two sets of such driving connections may be provided that will not only have small amounts of slip but whose slips will be so nearly identical that the lost motion or slip in one set is substantially equal to that in the other. In the instant invention the two sets of driving connections 4 and 5 are as nearly identical as it is practicable to manufacture them in order that their slips or lost motion will be substantially identical. Furthermore, the rotatable switch or contactor 2 and mirror 3 are driven at the same speed which here by virtue of the gearing employed is some multiple of the speed of the shaft 1. It is to be understood, however, that it is not necessary to drive the switch and mirror at a speed in excess of that of the shaft. If desired, the switch and mirror may be driven at a speed which is either equal to or less than the speed of the shaft.

For providing an intermittently luminous source of light there is shown a lamp 8 suitably connected to electrical conduits 9 and 10 which extend to a source of electromotive force not shown. The lamp 8 may be of any suitable design known to the prior art which has the property of giving a flash of light when momentarily energized. As illustrative of one such type of lamp I may employ a stroboscopic source of light which gives an extremely short flash when the electrical circuit is momentarily closed. The switch or contactor 2 may be any type known to the prior art and may be designed to momentarily close the circuit to the lamp 8 once in each of its revolutions, or alternatively to close the circuit momentarily several times in each revolution at suitably spaced intervals.

A suitable light impervious container 11 is provided as shown to enclose the source of light 8 and thereby exclude any external and extraneous light. A screen 12 is mounted within the container and is interposed between the source of light 8 and the rotatable mirror 3. This screen may be either transucent with an opaque center mark or indicium 13 or opaque with a transparent or translucent center mark. A telescope 14 or any other suitable means is disposed to receive reflected light from the mirror 3, and is provided with a scale in its field. This scale may be calibrated in any arbitrary marks, as for example, in degrees of twist or to read directly in foot-pounds of torque for the shaft.

The operation of my apparatus may be described as follows. Let it first be assumed that the shaft 1 is rotating without delivering power and hence is not subjected to any torsional forces. Under these conditions every time the light 8 flashes a reflected image of the center mark or indicium 13 will be visible at a definite position on the scale in the telescope 14 which position may be taken as the zero mark. If the shaft now delivers power with attendant torsion or twisting about its longitudinal axis the reflected image of the indicium 13 will now be seen at another location on the calibrated scale within the field of the telescope 14, the new location being displaced from the zero mark of the scale an amount proportional to the twist or torsion in the shaft. The displacement of this image is due to the fact that any torsion in the shaft causes the mirror to take a different angular position over that obtaining under conditions of no load. The calibrated scale associated with the telescope gives a direct reading of the displacement of the reflected image in terms of the torsion in the shaft.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. An apparatus for observing the torsion phenomena of a rotating shaft, comprising in combination an electrical system including a source of light and a rotatable switch for closing the system at predetermined intervals to cause an intermittent operation of said source of light, a rotatable mirror disposed to receive light from said source, means for driving said mirror from a point on said shaft, other means for driving said switch from a point on said shaft distant from the aforesaid point, and indicating means disposed to receive light from said mirror.

2. An apparatus for observing the torsion phenomena of a rotating shaft at a plurality of stages in a single rotation, comprising in combination an electrical system including a source of light and a rotatable switch for closing the system at predetermined intervals to cause an intermittent operation of said source of light, a rotatable mirror disposed to receive light from said source, means for driving said switch and mirror from different points on said shaft at substantially the same speed which speed is different from that of said shaft, and indicating means disposed to receive light from said mirror.

3. An apparatus for observing the torsion phenomena of a rotating shaft, comprising in combination a source of light which is rendered luminous upon energization thereof, means operable to cause the intermittent energization of said source, a rotatable mirror disposed to receive light from said source, means for driving said mirror from a point on said shaft, and other means driven by said shaft from a point thereon distant from the aforesaid point for rendering said first mentoned means operable.

4. An apparatus for observng the torsion phenomena of a rotating shaft at a plurality of stages in a single rotation, comprising in combination a source of light which is rendered luminous upon energization thereof, means operable to cause the intermittent energization of said source, a rotatable mirror disposed to receive light from said source, means for driving said mirror from a point on said shaft at a speed which is different from that of the shaft, and other means driven by said shaft from a point thereon distant from the aforesaid point for rendering said first mentioned means operable.

5. An apparatus for observing the torsion phenomena of a rotating shaft, comprising in combination an electrical system including a source of light and a rotatable switch for closing the system at predetermined intervals to cause an intermittent operation of said source of light, a rotatable mirror disposed to receive light from said source, means provided with an indicium and interposed between said source of light and said mirror, means for driving said mirror from a point on said shaft, other means for driving said switch from a point on said shaft distant from the aforesaid point, and indicating means disposed to receive a reflected image of said indicium from said mirror.

6. An apparatus for observing the torsion phenomena of a rotating shaft at a plurality of stages in a single rotation, comprising in combination an electrical system including a source of light and a rotatable switch for closing the system at predetermined intervals to cause an intermittent operation of said source of light, a rotatable mirror disposed to receive light from said source, means provided with an indicium and interposed between said source of light and said mirror, means for driving said switch and mirror from different points on said shaft at substantially the same speed which speed is different from that of said shaft, and indicating means disposed to receive a reflected image of said indicium from said mirror.

LYBRAND P. SMITH.